United States Patent
Krysiak

(10) Patent No.: US 11,117,842 B2
(45) Date of Patent: Sep. 14, 2021

(54) ENCAPSULATED SEED

(71) Applicant: Michael Krysiak, New Franken, WI (US)

(72) Inventor: Michael Krysiak, New Franken, WI (US)

( * ) Notice: Subject to any disclaimer, the term of this patent is extended or adjusted under 35 U.S.C. 154(b) by 6 days.

(21) Appl. No.: 16/508,449

(22) Filed: Jul. 11, 2019

(65) Prior Publication Data

US 2020/0017419 A1    Jan. 16, 2020

Related U.S. Application Data

(60) Provisional application No. 62/696,775, filed on Jul. 11, 2018, provisional application No. 62/768,961, filed on Nov. 18, 2018.

(51) Int. Cl.
| | | |
|---|---|---|
| *C05G 5/35* | (2020.01) | |
| *C05D 3/00* | (2006.01) | |
| *C05D 9/00* | (2006.01) | |
| *A01C 1/06* | (2006.01) | |
| *C05F 11/08* | (2006.01) | |
| *C05F 11/04* | (2018.01) | |
| *A01N 65/00* | (2009.01) | |
| *A01N 61/00* | (2006.01) | |
| *C05G 3/80* | (2020.01) | |
| *C05G 5/12* | (2020.01) | |

(52) U.S. Cl.
CPC .................. *C05G 5/35* (2020.02); *A01C 1/06* (2013.01); *A01N 61/00* (2013.01); *A01N 65/00* (2013.01); *C05D 3/00* (2013.01); *C05D 9/00* (2013.01); *C05F 11/04* (2013.01); *C05F 11/08* (2013.01); *C05G 3/80* (2020.02); *C05G 5/12* (2020.02)

(58) Field of Classification Search
CPC .... C05G 5/12; C05G 5/35; C05G 3/80; C05F 11/04; C05F 11/08; C05F 11/00; C05F 11/02; A01N 65/00; A01N 61/00; A01N 25/00; C05D 3/00; C05D 9/00; A01C 1/06; Y02P 60/21; Y02A 40/22
See application file for complete search history.

(56) References Cited

U.S. PATENT DOCUMENTS

| | | | | |
|---|---|---|---|---|
| 8,474,183 B2 * | 7/2013 | Krysiak | ................. | A01G 24/22 49/9 |
| 9,554,502 B2 * | 1/2017 | Madsen | ................... | A01C 1/06 47/57 |
| 2012/0317880 A1 * | 12/2012 | Hendrickson | ............ | A01C 1/04 47/58.1 SE |
| 2020/0270183 A1 * | 8/2020 | Merritt | .................... | C05F 11/02 |

OTHER PUBLICATIONS

Biology4Kids, "Plants: Angiosperms", 2020, accessed from www.biology4kids.com/files/plants_angiosperm.html#:~:text=When youare a monocot,%2C palm trees%2C and lilies. (Year: 2020).*
RxList, "Guar Gum", 2020, accessed from https://www.rxlist.com/guar_gum/supplements.htm (Year: 2020).*
Kutschera, "Plant-Associated Methylobacteria as Co-Evolved Phytosymbionts", Plant Signal Behav. Mar.-Apr. 2007; 2(2): 74-78 (Year: 2007).*

* cited by examiner

*Primary Examiner* — Jennifer A Smith
*Assistant Examiner* — Amanda Garley
(74) *Attorney, Agent, or Firm* — Philip M. Weiss; Weiss & Weiss

(57) ABSTRACT

Encapsulated seeds, processes for making encapsulated seeds and processes for establishing and improving seed beds and seed bed germination. The encapsulated seeds improve soil productivity through enhancements in soil fertility, soil condition/tilth, and control of soil moisture.

17 Claims, No Drawings

ENCAPSULATED SEED

FIELD OF THE INVENTION

The present invention relates to encapsulated seeds, processes for making encapsulated seeds and processes for establishing and improving seed beds and seed bed germination. This invention is directed at improving soil productivity through enhancements in soil fertility, soil condition/tilth, and control of soil moisture.

BACKGROUND OF THE INVENTION

The sizes, shapes, and physical characteristics of the various kinds of seeds are varied. There are a variety of challenges in handling and distributing such seed, as well as with sowing of such seed in suitable growing media. Certain seed may desirably be sowed by a broadcast method if the seed were compatible with broadcast application. For example, grass seed for lawns is desirably broadcast, but the low density and generally non-aerodynamic shape of some grass seed can limit the range of such broadcast, and make such seed susceptible to being blown about by wind, or washed away by surface water, even if initially well placed in a good seeding application. Also the seed may be so small as to be difficult to handle, thereby to place properly-spaced seeds at a desired spacing as to make cost-effective use of the seed, thereby to produce a crop of the related plants without using any more seed than necessary, thus to gain maximum benefit from the amount of seed used.

While small seed may be efficiently handled by industrial equipment especially designed for handling such seed, typically the user of such seed also handles various other types of seed; and may be unable to justify the cost of such specialty seed-handling equipment. Rather, the seed user typically has a limited range of seed handling equipment which must be capable of being used and/or adapted to handle and apply all the types of seeds being used by that user. Where the seed itself can be adapted to the equipment, specialty seed can be handled without need for any specialized equipment.

Even where the seed may be sown by hand, such as in seedling or bedding trays or pots, some seeds are so small as to be difficult for the sower/user to effectively manipulate and control by hand.

When seed is planted, the seed has immediate use for moisture to aid in germination of the seed, and subsequent early development of the resulting young plant. Where moisture is not readily available to the seed when planted, the seed may lie in a dormant state for some period of time before germinating. While the seed is thus dormant, awaiting suitable moisture, the seed is subject to a variety of hazards which may destroy its viability. The seed may be attacked by worms, parasites, and other pests. The seed may be eaten by foraging animals including insects and larvae. The seed may be overheated by a hot sun. The seed may lie dormant without germinating for so long that any plant emerging therefrom will have insufficient time to mature before the end of the growing season.

If and when the seed does germinate, the seedling plant has a continuing need for a proper balance of moisture and oxygen, as well as for such plant nutrients as nitrogen, phosphorous and potash, as well as the micronutrients, in relatively predictable quantities. To the extent the proper balance of such materials is available to the young plant, a healthy young plant may be produced, with optimum potential for maximum crop production, assuming germination occurs at a seasonably-desirable time.

To the extent one or more such materials is not available to the seed and/or the young plant, plant growth, plant health, and ultimately maturity, may be adversely affected. For example, the soil may be too dry to support germination, or optimum germination. Or while the soil may in general have a desired moisture content, moisture content at a macro level can vary widely. Thus, while the soil in general may have a desirable moisture content, the microcosm of the soil adjacent an individual seed may be too dry, or too wet, to support any germination, or optimum germination.

Similarly, the soil may be generally depleted of one or more plant nutrients needed by the germinated seedling. Or while the soil may in general have desired nutrient levels, the nutrient levels at a macro level can vary widely. Thus, the microcosm of the soil adjacent an individual seed may be too low in one or more nutrients to support a desired level of plant growth, or, so high as to be toxic to a desired level of plant growth.

Further, plant nutrient chemicals may be present in the soil, but so tied up chemically in the soil as to be unavailable, or poorly available, relative to the quantities and use rates needed for desired plant growth. Or the soil may become so hard, dry, and/or caked shortly after the seed germinates that the seedling plant has difficulty penetrating such soil, difficulty becoming associated with suitable nutrients, and/or difficulty taking up such nutrients because of insufficient moisture availability.

After the plant has further developed such that the plant roots extend deeper into the soil, conditions of the soil near the surface are less critical. However, until such time as the roots so penetrate, conditions of the soil at and near the top surface of the soil may be critical.

Soil fertility generally relates to uptake of plant nutrients from the soil by plants. Uptake is generally the result of two factors, the presence of plant nutrients in the soil, and the availability of the plant nutrients for plant uptake. Presence of plant nutrients in the soil is generally a function of the combination of (a) the basic level of soil fertility, (b) depiction by previous crop production and (c) replenishment with fertilizer. Availability of a plant nutrient physically present in the soil for plant uptake is in general related to solubility of the respective nutrient or nutrient combination in a solvent for the nutrient, which solvent is present in the soil, such solvent as water, along with any other material affecting solvation of the plant nutrient into the water or other solvent.

In order for plant nutrients in the soil to be available for uptake by plants, the nutrients must be held in the soil without excessive leaching, but must not be held so tightly that the nutrients cannot be released for plant uptake. Thus nutrient availability requires a balance between holding tightly enough to retain the nutrient in the root zone, without leaching, but not so tight as to make the nutrient unavailable for plant uptake. Thus, the general "condition" or "tilth" of the soil is instrumental in determining the efficiency with which plant nutrients are utilized for plant nutrition.

A properly conditioned soil has advantageous soil chemistry in combination with advantageous soil texture. Thus, in addition to providing specific plant nutrients, soil users also use products that modify basic soil chemistry, and soil texture. Basic soil chemistry is modified by adding to the soil, for example, calcium products to provide pH control, as well as micronutrients.

SUMMARY OF THE INVENTION

The following definitions will be used in the description of the invention.

"Coated" or "Encrusted Seed" shall mean a seed that has been covered by a layer(s) of materials that obscure the original shape and size of the seed resulting in a substantial weight increase. The coating or encrusting may contain biological, identifying colorants or dyes, pesticides, polymers and/or other ingredients.

"Pelleted Seed" shall mean coated or encrusted seed that also improves the plantability or singulation of the seed.

"Film-Coated Seed" shall mean a seed that retains the shape and general size of the raw seed with a minimal weight gain. The film coating may contain biological, identifying colorants or dyes, pesticides, polymers and/or other ingredients. The coating shall result in a continuous covering.

"Treated. Seed" shall mean seed with a minimal covering of material(s) whose objective is to reduce or control disease organism, insects, or other pests attacking the seed or seedlings growing therefrom and may contain identifying colorants or dyes.

"Undesirable Grass Seeds" shall mean seed of a grass species declared to be restricted noxious weed seed when found in lawn and turf seed.

"Total Viable" shall mean equals the sum of percentage germination plus dormant plus hard seeds.

"Turfgrass seed" shall mean any of various grass seeds for grasses (such as Kentucky bluegrass or perennial ryegrass) grown to form turf.

"Soil Tilth" shall mean its physical condition, especially in relation to its suitability for planting or growing a crop. Factors that determine tilth include the formation and stability of aggregated soil particles, moisture content, degree of aeration, rate of water infiltration and drainage.

"Sown" shall mean to scatter (seed) over land, earth, for growth; plant.

"Agglomeration" shall mean a particle size enlargement process in which fine particles are joined in an assembly.

"Nucleating Agent" shall mean an agent used for forming a nucleus.

"Microenvironment" is the environment surrounding the seeds.

"Encapsulated seed" shall mean that the seed is enclosed in a capsule of encapsulating material.

The present invention relates to an encapsulated seed product comprising: turfgrass seeds, encapsulation material and binder. The encapsulation material is agglomerated about each turfgrass seed. Each seed acts as a nucleating agent for the encapsulation material to be agglomerated about the seed. The encapsulation material comprises two or more materials selected from the group consisting of: gypsum, biochar, peat moss or bentonite clay. The encapsulation material is present by weight in the encapsulated seed product in a ratio equal to, or greater than, two parts the encapsulation material to one part seed. It is preferred that the encapsulation material is greater than two parts encapsulation material to one part seed.

The encapsulated seed product essentially sinks in water within approximately 10 seconds. The encapsulated seed product remains essentially about the seed to form a microenvironment about the seed when the seed is sown and exposed to water.

It is an object of the present invention for the encapsulation material to further comprise fertilizer. It is an object of the present invention for the encapsulation material to further comprise a water-soluble soil stabilizer. It is an object of the present invention for the encapsulated seed product to comprise a binder and for the binder to comprise lignin sulfonate.

It is an object of the present invention for the encapsulation material to further comprise pink pigmented facultative methylotroph PPFM.

It is an object of the present invention for the encapsulation material to further comprise soil amendments, soil conditioners or a combination.

It is an object of the present invention for the encapsulation material to further comprise lime, iron, gypsum, sulfur, mycorrhiza or any combination thereof.

The present invention relates to an encapsulated seed product comprising: turfgrass seeds, encapsulation material and binder. The encapsulation material is agglomerated about the seeds using an agitation agglomeration process. Each seed acts as a nucleating agent for the encapsulation material to be agglomerated about the seed. The encapsulation material comprises gypsum, biochar, peat moss, and bentonite clay. The encapsulation material is present by weight in the encapsulated seed product in a ratio equal to, or greater than, two parts encapsulation material to 1 part seed. The encapsulation material absorbs 5 times its weight in water. It is an object of the present invention for the encapsulation material to absorb 10 times its weight in water. It is an object of the present invention for the encapsulation material to absorb 5 times its weight in water compared to a seed of equal weight not having the encapsulation material. It is an object of the present invention, for example, that the material wrapped around the seed would absorb 5 times its weight, and if twice the material is wrapped around the seed it will absorb 10 times its weight. The encapsulated seed product essentially sinks in water within 10 seconds. The encapsulation material about the seed deters birds from eating the seed when sown on soil surface. The encapsulated seed product remains essentially about the seed to form a microenvironment about the seed when sown and exposed to water. It is an object of the present invention for the binder to comprise lignin sulfonate.

The present invention relates to a seed having a coating comprising: biochar, gypsum, sodium bentonite clay and/or calcium bentonite clay, peat moss, guar gum and a water soluble soil stabilizer.

It is an object of the present invention for the biochar to have microbials. Biochar has countless pores and channels, which are safe harbors for healthy microbes. Microbes on the soil get destroyed. It is an object of the present invention for the microbes in the biochar to have a longer life then microbes put directly in the soil.

It is an object of the present invention for the coating composition to be applied to the seed by agglomeration and preferably an agitation agglomeration. It is further preferred that the agitation agglomeration be a lift and tumble agglomeration. The agglomeration process binds the coating material onto and surrounding the seed. The seed is a nucleating agent for the agglomeration process.

It is an object of the present invention for the dry ingredients, biochar, peat moss, gypsum, and clay to be blended together in an admixture. It is an Object of the present invention for the blending to occur before the admixture is agglomerated onto the seed. A coating drum is used wherein at the inlet of the coating drum the seed is fed in. A first spray of water and guar gum is used to act as a binder on the seed. The seeds coated with the binder are then tumbled into a continuous flow of the admixture. In a preferred embodiment the coated seed is then hit with water and admixture three more times to finally encapsulate the seed.

It is an object of the present invention to first add the guar gum to the seed prior to entering the drum and then add the pre-treated seed to the drum and continue the process of encapsulating the seed. In this particular embodiment, the pre-coating of the seed leads to a more uniform application of the encapsulating material on the seed.

It is an object of the present invention to prepare a consistent particle size. A larger particle size is more difficult to granulate.

It is an object of the present invention for the encapsulated seed to be dried to remove moisture, but not to damage the seed.

It is an object of the present invention to add a water soluble soil stabilizer either during the encapsulation process or after the encapsulation process. It is an object of the present invention to surface coat the encapsulated seed with a water soluble soil stabilizer. It is an object of the present invention that once the seed is planted and water is added to it that the water soluble soil stabilizer creates a fish eye and assists in holding the encapsulation material about the seed. It is an object of the water soluble soil stabilizer to assist the encapsulated seed with germination.

It is an object of the present invention for the encapsulated seed to deter animals including birds. It is an object of the present invention for the encapsulated seed to absorb and release water. It is an object of the present invention for the encapsulated seed to add organic matter to the soil. It is an object of the present invention for the encapsulated seed to adjust soil pH. It is an object of the present invention far the encapsulated seed to ionically bond the seed to the soil so that it stays in place where it is planted. It is an object of the present invention for the encapsulated seed to retain nutrients right where the plant needs them.

It is an object of the present invention for the encapsulated seed to be a self-contained planting unit. It is an object of the present invention for the seed to be protected from adverse environmental conditions. It is an object of the present invention for the encapsulated seed to have all the ingredients necessary for seed germination. It is an object of the present invention for the encapsulated seed to have a longer shelf life than a non-encapsulated seed. It is an object of the present invention for the encapsulated seed to be suitable for planting directly on top of the soil.

It is an object of the present invention to pretreat the seed with bacteria and nitrogen.

It is an object of the present invention for the encapsulated seed to have approximately 5 times more moisture acquisition then raw seed. It is an object of the present invention for the encapsulated seed to have approximately 10 times more moisture acquisition then raw seed.

It is an object of the present invention to provide an encapsulation composition surrounding a single turf grass seed in relative amounts to hold moisture about the turf grass seed, and provide immediate use of said moisture to assist in germination of the turf grass seed.

It is an object of the present invention for the encapsulation material to be a dry particulate material, a particulate material suspended in a liquid carrier, or any combination thereof, during the agglomeration process. It is an object of the present invention that during the agglomeration process there is a building up one or more layers of encapsulation material composition onto the seed. It is an object of the present invention for the process to further comprise drying off moisture from the seed product to form an agglomerated seed product.

It is an object of the present invention to maintain the encapsulated composition generally disposed about the seed until the seed germinates; the encapsulation composition providing water holding properties about the seed to enhance the control of moisture about the seed, the seed directly benefiting from moisture held by the soil conditioning material, irrespective of the overall tilth of soil.

It is an object of the present invention for the encapsulation material to further comprise lime, gypsum, calcium carbonate, or any combination thereof.

It is an object of the present invention for the encapsulation composition to further comprise a fertilizer, a fungicide, an herbicide, or any combination thereof.

It is an object of the present invention for the agglomeration process to form the agglomerated seed product in a single agglomeration apparatus.

It is an object of the present invention for the agglomerated seed product to provide enhanced growing conditions compared to separate application of each of the soil conditioning material and grass seed to soil.

It is an object of the present invention for the encapsulation composition to incubate the seed and provide a beneficial germination environment by binding to the seed to form a self-contained, value added agglomerated seed product.

It is an object of the present invention for the encapsulation composition to further comprise a fertilizer, wherein the fertilizer comprises nitrogen, phosphorous, potassium, sulfur, manganese, copper, boron, iron, zinc, magnesium, chromium, monoammonium phosphate, diammonium phosphate, superphosphate, triple superphosphate, dicalcium phosphate, organic fertilizer, or any combination thereof.

It is an object of the present invention to provide an encapsulated seed, wherein the encapsulation material encapsulates one viable seed. The seed acts as a core or pseudo core of the encapsulated seed. The encapsulated material is mounted proximate, including disposed outwardly of the outer surface of the seed.

It is an object of the present invention for the encapsulation material to provide enhanced broadcast flight properties of the encapsulated seed. It is an object of the present invention for the encapsulated material to reduce susceptibility to deleterious effects of weather on the encapsulated seed. It is an object of the present invention for the encapsulation material to enhance resistance of the encapsulated seed to attack by animals, weeds, or spore-formers. It is an object of the present invention for the encapsulated material to assist in staged germination of the encapsulated seeds under a given set of conditions, over a period of time longer than the range of germination times inherent in the seeds. It is an object of the present invention for the encapsulated material to enhance control of moisture about the seed thereby to assist in seed germination. It is an object of the present invention for the encapsulated material to contain compounds that promote or stimulate seed germination, including natural plant hormones (e.g., gibberelic acid) and natural compounds that contain plant hormones (i.e. seaweed and seaweed extract). It is an object of the present invention for the encapsulated material to assist in providing release of plant nutrients into soil onto which the encapsulated seed is placed.

It is an object of the present invention for the encapsulated material to provide a soil conditioning effect to soil onto which the encapsulated seed is placed. It is an object of the present invention for the encapsulated material to provide a staged release of plant nutrients into soil onto which said encapsulated seed is placed, over a period of time longer than the range of times inherent in the chemical composition so released. It is an object of the present invention for the encapsulated material to provide a higher embryo emergence and survival rate in a population of the encapsulated seeds, thereby reducing required seed planting density for a desired plant population density. It is an object of the present invention for the encapsulating material to assist in stabilizing moisture content in soil on which such encapsulated seed is disposed.

It is an object of the present invention for the seeds to be a turf grass seed.

It is an object of the present invention for the seeds to be selected from the group consisting of grass, herbs, animal forage and fodder crops, ornamental plants, vegetables, grains, and flowers.

It is an object of the present invention for the encapsulation material to remain generally disposed about the seed, and preferably but not necessarily remains generally intact about the seed, until the seed germinates.

It is an object of the present invention for the encapsulation material to hold moisture adjacent to the seeds in the encapsulated seeds or in the soil adjacent to the seeds, in such quantities to enhance growing conditions for the seeds It is an object of the present invention to pre-coat the seed with a material which enhances the ability of the seed to act as a nucleus in an agglomeration operation and subsequently coating the pre-coated seed with a soil conditioning material. It is an object of the present invention for the pre-coating to occur by spraying the pre-coated material onto the seed.

It is an object of the present invention to place the encapsulation material in close proximity to each seed.

The present invention relates to encapsulated seeds that provide soil conditioning properties at the specific site of the seed, plant nutrients at or near the specific site of the seed, ingredients effective to reduce deleterious effects of spore-formers and animals, and/or other various physical benefits/properties of the encapsulated seed not previously available in a single product.

It is an object of the present invention for the encapsulating material to comprise a particulate powder, or may be fibrous, or may be a suspension of a powder or fibrous material in a liquid carrier, and is preferably agglomerated onto the substrate seed to form a seed capsule.

It is an object of the present invention for the seed to not fall out of the encapsulating material or be easily be broken out or removed by dissolution of materials at and near the surface of the seed capsule.

It is an object of the present invention for the seeds to be encapsulated in a drum that rotates. The drum having flights that lift and mix the seeds. When in use the drum rotates continuously. Seeds or pre-coated seeds are continuously fed into an inlet end and thus added to the rolling bed. Flights continuously mix the bed as the drum rotates, refreshing the bed surface with newly fed seeds, or seeds and seed capsules newly brought to the surface by the continuous rotation of the drum in combination with the mixing action of the flights. Spray assembly sprays the binding material onto the continuously moving and mixing surface of bed from a plurality of nozzles distributed along the length of the drum, adding the sprayed material to the seeds and seed capsules in the bed. The dry admixture is then added to the seed having the binder on it. The encapsulated seeds are discharged through discharge end.

In general, as the seeds traverse the drum, from inlet to discharge, nozzles provide binder and/or water onto the seeds in the bed. The seeds are roiled in the admixture. The result is that the seeds become generally uniformly encapsulated with one or more layers of the encapsulating material such that the encapsulating material becomes an integral part of the respective seed capsules fabricated in the drum. The encapsulating material tightly bonds to the respective portions of the seeds. As the seeds and seed capsules roll and mix with rotation of the drum, the incline of the drum causes the seeds and seed capsules to travel from inlet end toward discharge end.

It is an object of the present invention for the encapsulating, process to use a rotary drum, pan pelletizer, paddle mixer, or the like to obtain encapsulated seeds of the invention.

The encapsulating process operates according to conventional and generally well known agglomeration principles, as described by Wofgang B. Pietsch in an article entitled "The Agglomerative Behavior Of Fine Particles." Such process uses water and heat, along with physical and/or chemical adhesives and like properties, to bind or agglomerate a plurality of types of particles and/or materials into encapsulated seed capsules, each containing an individual seed.

To obtain agglomerates from relatively smaller particles of raw materials, binding forces must act within the individual developing agglomerate particles. According to known agglomeration principles, five different binding mechanisms are known to be useful for building agglomerate particles including solid bridges, interfacial attractions and capillary pressure, adhesion and cohesion, attraction between solid particles, and form-closed bonds.

At elevated temperatures, solid bridges can form by diffusion of molecules from one particle to another at the points of contact. Heat can be introduced from an external, secondary source or created during agglomeration by friction and/or energy conversion. Solid bridges can also build up by chemical reaction, crystallization of dissolved substances, hardening binders, and solidification of melted components.

Capillary pressure and interfacial attraction forces in liquid bridges can create strong bonds that disappear if the liquid evaporates and no other binding mechanisms take over.

Highly viscous bonding media such as tar and other high molecular weight organic liquids can form adhesive and/or cohesive bonds very similar to those of solid bridges. Thin adsorption layers are immobile and can contribute to such bonding together of fine particles under certain circumstances.

Typical short-range forces of the van der Waals electrostatic or magnetic type can cause attraction between solid particles whereby the particles stick together if such particles are sufficiently close to each other. Decreasing particle size clearly favors such attraction between solid particles.

Fibers, little platelets or bulky particles can interlock or fold about each other resulting in "form-closed" bonds.

In some embodiments of the encapsulation/agglomeration process, it is desirable to pre-coat the seeds prior to implementing agglomeration principles to produce the above described encapsulating of soil conditioning material. Such embodiments comprise light-weight and/or elongate shaped seeds (i.e. turf grass seeds), or other similar type of seed which may not readily or inherently serve as a nucleating agent in a conventional agglomeration process with the respective soil conditioning material which is desired to be encapsulated around the seed. Pre-coating the turf grass seed, for example, enhances the agglomeration of encapsulating material, or binder and/or of other encapsulating substances, by increasing the weight of the pre-coated turf grass seed and by providing a more filled in, more rounded shape to such long and narrow seeds. The increased weight and more filled in shape of the turf grass seed enables more effective, more efficient, processing of the seed in coating apparatus.

The form and composition of such pre-coating, when needed, can vary according to the weight, shape, composition, and surface properties of the seeds.

It is an object of the present invention for the encapsulated seeds to be passed into a rotary or other dryer in order to obtain a encapsulated seed containing 5% or less water. The maximum water fraction in the encapsulation material can vary according to the composition of the encapsulation material, so long as the resultant seed capsules remain suitably structurally strong and so long as a population of such encapsulated seed capsules remains free flowing in solid condition. The process for fabricating the seed capsules must maintain a temperature sufficiently low that the seeds are not heated so hot that viability of the seeds, for germination purposes, is not dramatically compromised. It is generally preferred that the temperature of the seeds be suitably controlled such that any binder and/or encapsulation material, or other materials applied to the seeds, cool at a controlled rate while bonds form between the seeds, or seed capsule precursors and the one or more soil conditioning and/or other encapsulation materials. Such temperatures of all materials are suitably controlled to avoid decomposition of the respective materials, loss of viability of the seeds, or breakage of seed capsules or seed capsule precursors, or encapsulation materials or other materials during such processing. The temperature at the rolling seed bed inside drum generally can range from about 130 degrees F. to up to at least 230 degrees F., for seed residence times up to at least 1 hour. At drum operating temperatures of less than 130 degrees F., drying time can become excessive. At temperatures above 230 F, the viability of the seed may be at risk, depending on the sensitivity of the seed, residence time, and other influential parameters. To reduce the potential of over drying seed when using a low temperature rotary dryer and/or the possibility of negatively affecting germination from overly high temperatures, a two-stage drying process can be used. In this process, rotary drying takes the seed to an intermediate moisture content (in the range of 10% to 25%) before drying is finished in a fluid bed dryer.

The above stated temperature range is illustrative and not limiting, and will vary depending on the seed, the encapsulation materials, and the specific process parameters of a particular encapsulation system and operation. Thus, drum coating temperatures can be less than 130 degrees F. or more than 230 degrees F. However, the stated range is preferred, including all temperatures within such range as, for example, 150 degrees F., 180 degrees F., 210 degrees F., and the like.

In an embodiment, seeds are fed continuously to an inlet end of a drum. Encapsulated seeds, produced as described above, are released from a discharge locus such as discharge end of the drum to a sizing apparatus in which the seed capsules are sized through conventional sizing elements. Suitably-sized seed capsules are discharged from the sizing apparatus as product for distribution. Undersize seed capsules are fed back into the mixer. Oversized seed capsules are fractured and screened for reprocessing. The recovered seed product can be further encapsulated with any of the encapsulation materials described above.

It is an object of the present invention for the soil conditioning products to condition the soil in terms of properties other than direct provision of plant nutrients.

It is known to make sequential applications of a soil conditioning material such as fresh or aged manure followed by inorganic fertilizer, all of which may be separate from the step of applying seed. And where seed is indeed applied in the same step, the seed and soil conditioner are not intimately bound in controlled positioning with respect to each other in common in individual particles of the product so applied, as in the invention.

Thus, improving the soil texture condition, soil tilth, increases the efficiency with which plant nutrients are retained and used for plant nutrition, as well as generally improving the environment of the soil to accommodate, and readily receive, root growth.

When soil conditioning materials and plant nutrients are applied separately to the soil, as in the prior art, the ratio of applied plant nutrients to applied soil conditioning material typically varies widely according to variations in the uniformity of the two applications of the two materials. Further, the soil conditioning material is generally not closely associated with the plant nutrients in the soil, and certainly neither soil conditioner nor the nutrients are controllably-closely associated with the seed, such that nutrient absorption benefits provided by the soil conditioning material are not assuredly associated with respective nutrients, and neither the soil conditioning material nor the nutrients is controllably and intimately associated with the seed as in a common capsule or other particle as in the invention.

Rather, where soil conditioning and nutrients are applied in separate applications and/or in applications separate from the application of the seed, the hulk of the soil conditioning material and the bulk of the nutrients are generally at least somewhat separated flow each other in space, and physically separated from the seeds, such that potential cooperative benefit of the soil conditioning material as relates to solvation and up-take of soil moisture and/or of the nutrients by the seed are not obtained, and/or are not obtained in controlled close association with the seed.

When the soil conditioning material, the nutrients, and the seed are separately applied to soil with different sets of equipment, the respective rates of application vary such that the desired ratios between the quantities of the several materials are applied somewhat non-uniformly. The variances from uniformity will be different for each of the applications, thus adversely skewing the relative ratios of the materials with respect to each other at different locations in the e.g. field. Further, when applied separately to the soil, the seed and the soil conditioner are not necessarily in intimate contact with each other as they are when both materials are combined into a single combined seed capsule product. Nor is the seed in closely controlled proximity (e.g. within the same capsule) with the nutrients.

By combining soil conditioning material in the same seed capsule with the seed, highly effective levels of soil conditioner are assuredly associated with the seed as the seed germinates and begins to grow. The soil conditioning materials can and do tend to retain moisture and nutrients in the soil in the defined area of the seed capsule by a variety of mechanisms, providing an extended time period during which nutrients can be taken up by the plants. Soil conditioning materials and plant nutrients are somewhat beneficial to each other for the overall cooperative achievement of soil fertility in the presence of the newly emerging plant which is dependent on such plant nutrients, and on moisture retained by the soil conditioner for uptake of such plant nutrients.

While soil conditioning materials do perform a number of highly interdependent tasks, one such task is in assisting in maintaining the plant nutrients in the root zone where they can be effectively used by the plants when needed. Another such task is in assisting to make the soil soft and friable in the root zone whereby the newly-emerged and very tender plant roots more readily penetrate the soil as they grow.

Where both soil conditioner and nutrients are incorporated with the seed into the seed capsule, the soil conditioner assists in strategically maintaining the combination of soil conditioner and plant nutrients in close and controlled proximity to each other and to the seed in the soil. Such strategic placement virtually assures that the sod conditioning material and nutrients are bound to each other, in proximate relationship with the seed, for a time, such that wherever the seed capsule may land when the seed is sown, the seed will have the initial benefit of both soil conditioner and nutrients in intimate proximity with itself, irrespective of any condition of the surrounding growth medium. Soil conditioning material and nutrients, are inherently bound to each other, and to the seed, as by the encapsulation process, and inherently assist the seed in achieving desired germination and strong early growth.

By incorporating the soil conditioning material in the same seed capsule with the seed, it ensures that the seed has benefit of intimate relationship with a beneficial amount of soil conditioner material. The seed thus receives the advantage of the beneficial amount of soil conditioner material irrespective of the overall filth of the soil and irrespective of the overall level soil conditioner, e.g. soil texture conditioner, in the root zone of the soil with which the seed capsule becomes associated for seed and plant growth purposes.

It is an object of the present invention for the encapsulated seeds to be disposed at the top surface of a cross section of soil. Root zone of the soil is generally defined to that depth of the soil which typically receives roots of growing plants, and is generally defined within 20-30 inches of the top surface of the soil. Generally, and preferably, the root zone should have a soft texture, rich in organic and/or other soil conditioning material in order to provide good filth, and desirable moisture and nutrient holding properties.

The encapsulation material draws moisture from the soil, into the capsule, where the moisture is available to assist in germination of seed. As root advances downward, the upper portion of the underlying soil under the capsule where the seed first enters the soil, has also been beneficially affected to the good of the plant by plant nutrients, and by moisture attracted or held in the vicinity of the capsule, as a result of the presence of the soil conditioning material in the capsule.

It is an object of the present invention for the processes that are used to make the encapsulated seed to use solely physical processes such as encapsulating and drying. While some minor chemical reactions may inadvertently accompany such physical processes, the invention does not rely on any chemical reaction for achievement of the objectives thereof. Rather the invention is focused on a physical combination of starting materials, which physical combination results in mutual benefits of the two starting materials (seed and encapsulation material) functioning intimately together, in primarily physical and physicochemical relationship, to produce an overall increase in benefits of plant germination and early plant growth with such combination seed improvement products.

The relative amounts of seed and encapsulation material depend on the overall benefits desired to be achieved from the encapsulation operations. Another benefit of low seed content by weight, especially with quite small seeds, is in creating, a larger size seed capsule, and thereby facilitating the handling of such seed in commonly-used seed handling machines such as grain drills or seed broadcast machines.

The size and density of the seed capsules can be readily controlled using conventional sizing equipment and processing parameters of the encapsulation process, so as to provide a uniform product of a wide range of sizes and densities. With the size and density of any seed thus controllable, the size and density may be selected and specified for enhancing control and efficiency of seed handling and/or distribution. Seeds which are non-aerodynamic, or which are so light as to be blown around, such as grass seed, can be made heavy and compact enough as to assuredly remain on location where sown after being planted.

The seed capsule is much heavier and dense than the seed itself, whereby the seed capsule provides substantial protection against the seed being washed away in surface water run-off. Thus, the encapsulation material about the seed serves many of the functions typically performed by the conventionally-used straw mulch. Accordingly, product of the invention can be used to seed new lawns without any need for use of straw or any other mulch material.

Where seed is desirably used to fill in bare spots in the lawn, such seed, especially fertility-enhanced seed capsules, may be applied desirably in one of two ways. First, the encapsulated seed product may be applied only to perceived bare spots, without use of straw. The soil conditioner in the seed capsules serve the functions of the straw as described above, but perform better than straw because of the close association between the seed and the soil conditioner.

In the alternative, the encapsulated seed product may be broadcast generally over the entire lawn. Where the lawn is already healthy with thick grass growth, the soil conditioner and nutrients will benefit the existing grasses, with minimal germination and growth of new seed from the seed capsules. Where the existing grass is thinner, the seeds in the seed capsules will have room and light to grow, whereby the combined properties of seed, soil conditioner, and nutrients, in intimate relationship with one another, will be efficaciously used.

DETAILED DESCRIPTION OF THE INVENTION

Example 1

A coating drum is used to place a coating as described above on grass seed. Raw material grass seed about 4-6 millimeters long and about 0.5-1.0 millimeter thick, is continuously fed into the drum, where the seed has binder added and then has the encapsulating material added, to form partially-developed seed capsules. The partially-developed seed capsules are continuously fed to inlet end of the drum to form a bed of the partially-developed seed capsules. The drum rotates continuously. The rolling of the drum, and the associated mixing effect of the flights, provide a constantly changing top surface of the bed. The encapsulating materials are added to the surface of the bed.

In an example the encapsulated seed comprises approximately by weight: seed 16.9%, Biochar 11.8%, Gypsum 19.6%, Sodium Bentonite Clay 45.9%, Peat Moss 3.0%, Guar Gum 2.9%. A water soluble soil stabilizer can also be added.

In a second example the encapsulated seed comprises approximately by weight: 0.5% water soluble soil stabilizer, 10.2% Biochar, 17.1% Gypsum, 39.8% clay, 15.3% peat moss, 14.6% seed and 2.5% Guar gum.

In a third example the encapsulated seed comprises approximately by weight: 10.3% Biochar, 17.1% gypsum, 40.0% clay, 15.4% peat moss, 14.7% seed, and 2.5% guar gum.

In a fourth example the encapsulated seed comprises approximately by weight: 0.5% water soluble soil stabilizer, 10.0% biochar, 16.7% gypsum, 39.0% clay, 15.0% peat, 14.3% seed and 4.5% guar. This example was used to make a dry mix of 907 grams.

In a fifth example the encapsulated seed comprises approximately by weight: 0.5% water soluble soil stabilizer, 9.5% biochar, 17.0% gypsum, 38.8% clay, 15.0% peat, 14.2% seed and 5.0% guar. This was used to make up 7,042 lbs of encapsulated seed.

Biochar can be made of many different types of organic matter. One example is biochar made from pine trees killed by pine beetles. In one example the peat moss is made from sphagnum peat moss. In one example the bentonite clay is a naturally occurring sodium or swelling bentonite clay.

In the examples the seed was a perennial ryegrass seed or Lolium perenne.

The invention claimed is:

1. A method for encapsulating a turf grass seed comprising:
    agglomerating encapsulation material and a binder about each of said turf grass seed to create an encapsulated seed product by an agitation agglomeration process;
    each of said seed acting as a nucleating agent for said agglomeration process;
    said agglomeration process being continuous and physically binding said encapsulation material in a homogeneous layer about each of said seed;
    said encapsulation material comprising two or more materials selected from the group consisting of: gypsum, biochar, peat moss or bentonite clay;
    said encapsulation material present by weight in said encapsulated seed product in a ratio equal to, or greater than, two parts said encapsulation material to one part said seed.

2. The method of claim 1 further comprising:
    first spraying a tackifier onto said seed and then coating said seed with said encapsulation material and additional tackifier during said agglomeration process to form said encapsulated seed.

3. The method of claim 2 further comprising:
    drying said encapsulated seed product to remove moisture but not damage said seed.

4. The method of claim 1 wherein said encapsulated seed product when placed in water sinks in ten seconds due to product density and weight.

5. The method of claim 1 wherein said binder comprises guar.

6. The method of claim 1 wherein said encapsulation material is blended prior to said agglomeration process.

7. The method of claim 1 wherein said agitation process is a lift and tumble agitation process.

8. The method of claim 1 wherein said agglomeration process uses a single agglomeration apparatus.

9. The method of claim 8 wherein said apparatus is a drum.

10. The method of claim 9 wherein said drum rotates; said drum having flights that lift and tumble said seed and said encapsulation material in developing said encapsulated seed.

11. The method of claim 1 wherein said binder is applied to said seed in a coating process prior to said agglomeration process.

12. The method of claim 1 wherein said encapsulation material remains about each gf said seed to form a microenvironment about said seed when said seed is sown and exposed to water.

13. The method of claim 1 wherein said encapsulation material further comprises fertilizer.

14. The method of claim 1 wherein said encapsulation material further comprises a water soluble soil stabilizer.

15. The method of claim 1 wherein said encapsulation material further comprises pink pigmented facultative methylotroph.

16. The method of claim 1 wherein said encapsulation material further comprises soil amendments, soil conditioners or a combination.

17. The method of claim 1 wherein said encapsulation material further comprises lime, iron, gypsum, sulfur, mycorrhiza, or any combination thereof.

* * * * *